United States Patent [19]
Nicosia et al.

[11] Patent Number: 5,654,890
[45] Date of Patent: Aug. 5, 1997

[54] HIGH RESOLUTION AUTONOMOUS PRECISION APPROACH AND LANDING SYSTEM

[75] Inventors: Joseph M. Nicosia, Carlsbad; Keith R. Loss; Gordon A. Taylor, both of Escondido, all of Calif.

[73] Assignee: Lockheed Martin, Bethesda, Md.

[21] Appl. No.: 251,451

[22] Filed: May 31, 1994

[51] Int. Cl.⁶ ............................................. G01S 13/02
[52] U.S. Cl. ..................... 364/428; 342/26; 342/33; 342/63; 342/118; 364/449.7; 364/453
[58] Field of Search ................................ 364/439, 443, 364/449, 450, 453, 428, 429; 342/33, 35, 26, 63, 64, 118, 128, 129, 179, 200

[56] References Cited

U.S. PATENT DOCUMENTS

| | | | |
|---|---|---|---|
| 3,416,752 | 12/1968 | Hembree | 244/3.17 |
| 3,715,753 | 2/1973 | Applebaum et al. | 342/131 |
| 3,775,766 | 11/1973 | Gendreu et al. | 342/33 |
| 4,103,300 | 7/1978 | Gendreu et al. | 342/33 |
| 4,106,726 | 8/1978 | Emmons et al. | 244/3.17 |
| 4,194,204 | 3/1980 | Alpers | 342/80 |
| 4,241,345 | 12/1980 | Johnson | 342/199 |
| 4,429,312 | 1/1984 | Chisholm | 342/410 |
| 4,495,580 | 1/1985 | Keearns | 364/450 |
| 4,562,439 | 12/1985 | Peralta et al. | 342/81 |
| 4,631,541 | 12/1986 | Prickett et al. | 342/195 |
| 4,646,244 | 2/1987 | Bateman et al. | 364/461 |
| 4,698,635 | 10/1987 | Hilton et al. | 342/64 |
| 4,768,156 | 8/1988 | Whitehouse et al. | 382/279 |
| 4,851,848 | 7/1989 | Wehner | 342/25 |
| 4,866,450 | 9/1989 | Chisholm | 342/33 X |
| 4,891,762 | 1/1990 | Chotiros | 364/456 |
| 4,910,674 | 3/1990 | Lerche | 364/443 |
| 4,914,734 | 4/1990 | Love et al. | 342/64 |
| 5,111,400 | 5/1992 | Yoder | 364/439 X |
| 5,136,297 | 8/1992 | Lux et al. | 342/64 |
| 5,227,801 | 7/1993 | Pierce | 342/192 |
| 5,428,361 | 6/1995 | Hightower | 342/201 |

*Primary Examiner*—Collin W. Park
*Attorney, Agent, or Firm*—Sughrue, Mion, Zinn, Macpeak & Seas

[57] ABSTRACT

An aircraft including an approach and landing system, including a navigation unit for providing navigation information, a weather radar unit for providing radar information, a processor which receives navigation information from the navigation unit and information from the weather radar unit, the processor unit providing an output representing information concerning the aircraft in accordance with the provided navigation information and radar information, a memory for storing information representing a scene, the processor unit correlating the stored scene information with the output representing information concerning the aircraft to provide a mapped scene, a display unit for displaying the output of said processor and the mapped scene, and a steppable frequency oscillator for providing a signal which is stepped in frequency to the weather radar unit, thereby providing an increased range resolution.

26 Claims, 8 Drawing Sheets

HIGH RESOLUTION AUTONOMOUS PRECISION APPROACH AND LANDING SYSTEM

FIELD OF THE INVENTION

The present invention is directed to an autonomous precision approach and landing system (APALS) for enabling low visibility landings at airports.

BACKGROUND OF THE INVENTION

Current industry practice for low-visibility landings is dependent on airport ground equipment and inertial navigation equipment. These techniques are limited to landings at those runways which are equipped with highly reliable transmitters of radio frequency localizer and glide slope information. These existing systems either land the aircraft using an automatic pilot or aid the pilot in landing the aircraft by providing the pilot with autopilot control commands displayed on a Head Up Display (HUD).

It has been suggested that future systems make use of information received from the Global Positioning System (GPS) in conjunction with on-board Inertial Navigation systems (INS) to generate the necessary precise navigation for landing. However, in addition to the external satellites required for GPS, these systems are currently envisioned to require ground stations at known locations near the runway for the differential precision necessary for landing. Other proposed systems provide the pilot with a real time image of the runway scene as derived from millimeter wave (MMW), X-Band, or infrared (IR) frequencies.

The following are further examples of navigation systems known in the art.

U.S. Pat. No. 5,136,297 to Lux et al discloses an autonomous landing system. The Lux patent includes a navigation unit employed in the system which includes a sensor, flight position data, an image correction unit, a segmentation unit, a feature extraction unit and a comparison unit. The Lux patent discloses that a comparison is conducted as to whether or not a sequence of features in the overflight path image pattern agrees with features found in a reference store, such as map data which is stored in the system. Further, Lux discloses the use of a radar navigation system for use as a sensor in the system.

U.S. Pat. No. 4,698,635 to Hilton et al discloses a radar guidance system coupled to an inertial navigation apparatus. The system includes a master processor, a radar altimeter, a video processor, a memory and a clock. The memory has stored therein cartographic map data.

U.S. Pat. No. 4,495,580 to Keearns is cited to show a navigation system including a radar terrain sensor and a reference map storage device for storing data representing a terrain elevation map.

U.S. Pat. No. 4,910,674 to Lerche discloses a navigation method which includes a correlator for comparing terrain reference data with processed altitude data obtained with a wave sensor.

U.S. Pat. No. 4,914,734 to Love et al is cited to show a map-matching aircraft navigation system which provides navigational updates to an aircraft by correlating sensed map data with stored reference map data.

U.S. Pat. No. 4,891,762 to Chotiros is cited to show a pattern recognition system for use in an autonomous navigation system.

The above-mentioned prior systems suffer from one or more of the following problems:

1) Reliance on ground-based systems for precise terminal landing information severely reduces the number of runways available for Cat III a and b landings (currently 38 runways in the U.S.).

2) Reliance on GPS and differential ground transmitters for GPS creates a need for currently rare ground equipment and a lack of reliability (based on the military nature of GPS). The GPS is a military program owned, operated, and paid for by the United States Air Force originally intended for military navigational purposes and is designed so that civilian use can be made of it but at a reduced accuracy. The military uses a very special code which gives them better accuracy, that is called the P code. The normal civilian code is called the C code which is good to about 30 m in accuracy; however, the military retains the right to disable the C code to the point where the accuracy goes down to about no better 100 m. This is what the military refers to as "selective availability" so that in time of conflict they can turn on selective availability and deny the enemy the ability to navigate better than 100 m. There are a number of schemes for getting around the inaccuracies imposed by the military. However, the Air Force has maintained a position that they are against any of these schemes which improve the accuracy when they are trying to make it inaccurate.

The lack of reliability is also a result of the fact that, in order to be accurate, at least four satellites must be present in the overhead view; and, if one of the four satellites fails, then the accuracy will be degraded. Thus, the reliability is not just based on the on-board equipment, i.e., the GPS receiver, but it is also based on the reliability of the satellites themselves.

3) Additional sensors, such as MMW and IR, currently envisioned for systems to provide pilots with the "situational awareness" necessary to successfully land in low visibility conditions are expensive additions to the on-board flight equipment and are marginal in performance. MMW real-beam radars provide "grainy" low resolution images which are difficult to interpret and IR systems cannot penetrate in many types of fog that cause the "low visibility" in the first place.

SUMMARY OF THE INVENTION

It is therefore an object of the present invention to overcome the problems associated with the prior approach and landing systems.

It is another object of the invention to provide an approach and landing system which provides low visibility take-off and landing assistance for several classes of aircraft.

It is another object of the invention to provide safe landing of general aviation and transport aircraft (covered by parts 25, 91, 121 and 125 in the Code of Federal Regulation) in low visibility conditions [Category II, IIIa, and IIIb defined by the Federal Aviation Administration (FAA)] without dependence on high reliability ground transmitting equipment.

These and other objects are accomplished by the present invention which provides an Autonomous Precision Approach & Landing System that makes use of radar echoes from ground terrain and cultural (man made) targets to provide the on-board Inertial Navigation System with accurate aircraft position and velocity updates. According to the invention, these measurements come from a modified standard X-band, low-resolution weather radar.

3

DETAILED DESCRIPTION OF A PREFERRED EMBODIMENT

Several of the important features of the APALS system according to the invention are set forth below:

A. Modified Weather Radar: The modification to a conventional weather radar allows the modified weather radar to make high resolution synthetic aperture maps of overflown terrain.

B. Area Correlation: This refers to the application of matching synthetic aperture radar maps with previously stored references to locate specific spots on the ground near a path to a specific runway.

C. Range/Range Rate Measurements Integrated Into Kalman Filter: This refers to the application of using high resolution radar range and velocity measurements of specific, but not augmented, spots on the ground of known location to update a navigation system using Kalman filtering.

D. Situational Awareness Display Format: This refers to the application of precise navigational information to provide the pilot with a "situational awareness" display of sufficient accuracy to allow the pilot to land the aircraft in low visibility conditions in the same manner as if (s)he were using his/her judgement to land the plane in good visibility conditions.

Each of the above features is discussed in detail below.

Figure 1:
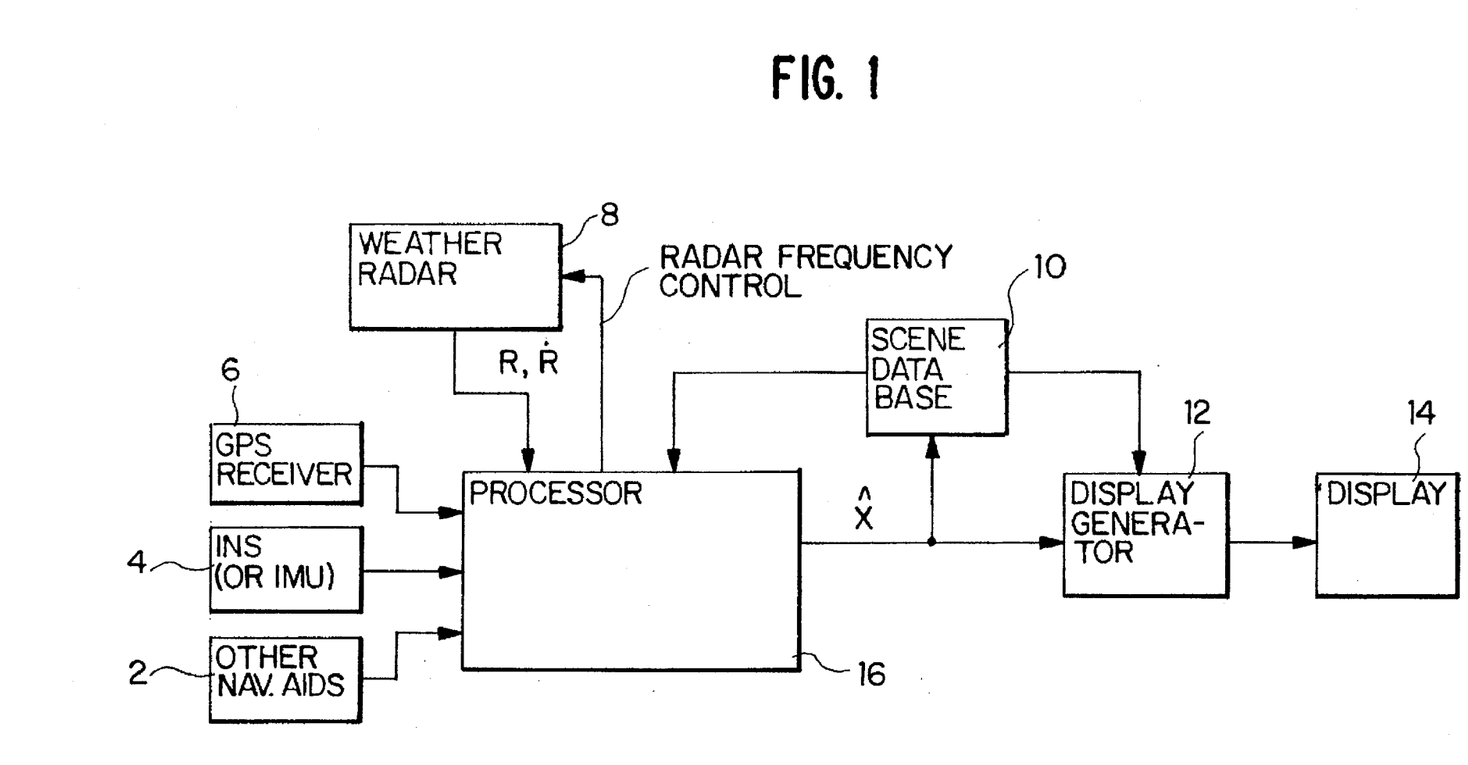
FIG. 1 is a block diagram of the APALS system according to the invention.

FIG. 1 is a block diagram of the APALS system according to the present invention. The other NAV Aids 2 refers to the navigation aids that are conventionally employed on any aircraft and include, for example, a VOR (VHF omnidirectional radar), DME (distance measuring equipment) receiving equipment, the artificial horizon, the vertical gyro, the airspeed indicator, and the altimeter (which is a barometric altimeter). The APALS processor 16 will make use of this information in order to monitor the reasonableness of the APALS estimate concerning the state of the vehicle, which is the output $\hat{X}$ from the processor 16. The above-discussed elements all interface to the system over a standard interface bus such as the known ARINC 429 bus.

The INS (inertial navigation system) or IMU (inertial measurement unit) 4 are inertial instruments that measure the translational accelerations and the angular rates. There are several different IMU's that can be employed in APALS, one of which is, for example, a Bendix unit known as the Bendix mini-tact IMU.

The GPS receiver 6 is a special receiver that is designated to receive the satellite signals and deduce from those satellite signals the position and velocity of the aircraft. There are several models that can be used for this, but there is only one or two at present that have passed the FAA requirements for primary navigation equipment on-board an aircraft.

4

The weather radar 8 which is also equipment that will already be on-board the aircraft is, according to the invention, as will be discussed below modified. For example, the Honeywell Primus 870 made by Honeywell may be employed. This radar is a non-coherent radar so it would have to be modified with a new receiver and transmitter to make it coherent. The weather radar 8 provides a range R, and range rate R' outputs to the Processor. The weather radar 8 receives a radar frequency control signal from the Processor 16 which will be discussed below in connection with the radar modification shown in FIG. 3.

The scene data base 10 is a data base created by going to different airports that will use the system and making flights during which the radar signatures of the ground returns are measured. Further, aerial photographs are taken to use together with the radar data to make references which would then be used to compare against the radar returns that will occur when the actual low visibility landing is taking place.

The display generator 12 and the display 14 are typically supplied by the manufacturer of the device known as a Head-Up Display (HUD), which is what the APALS uses as a see through device that allows the pilot to view the outside world, and see the APALS display in front of him or her. The pilot will see a virtual runway even when the actual runway is obscured by, for example, clouds or fog. Suitable HUD's are currently built by GEC Avionics (Great Britain), Flight Dynamics, Inc. (Portland, Oreg.) and Sextant Avionique (France). The actual APALS output is a vector labeled $\hat{X}$ and consists of the position, velocity and attitude information of the aircraft as best determined by the APALS system. The display generator typically takes that information and generates what the outside world scene would look like from the currently estimated state of the aircraft, $\hat{X}$.

The processor 16 receives inputs from elements 2, 4, 6, 8 and 10 and outputs vector $\hat{X}$. There are a number of known processors that can be used for APALS.

Figure 2:
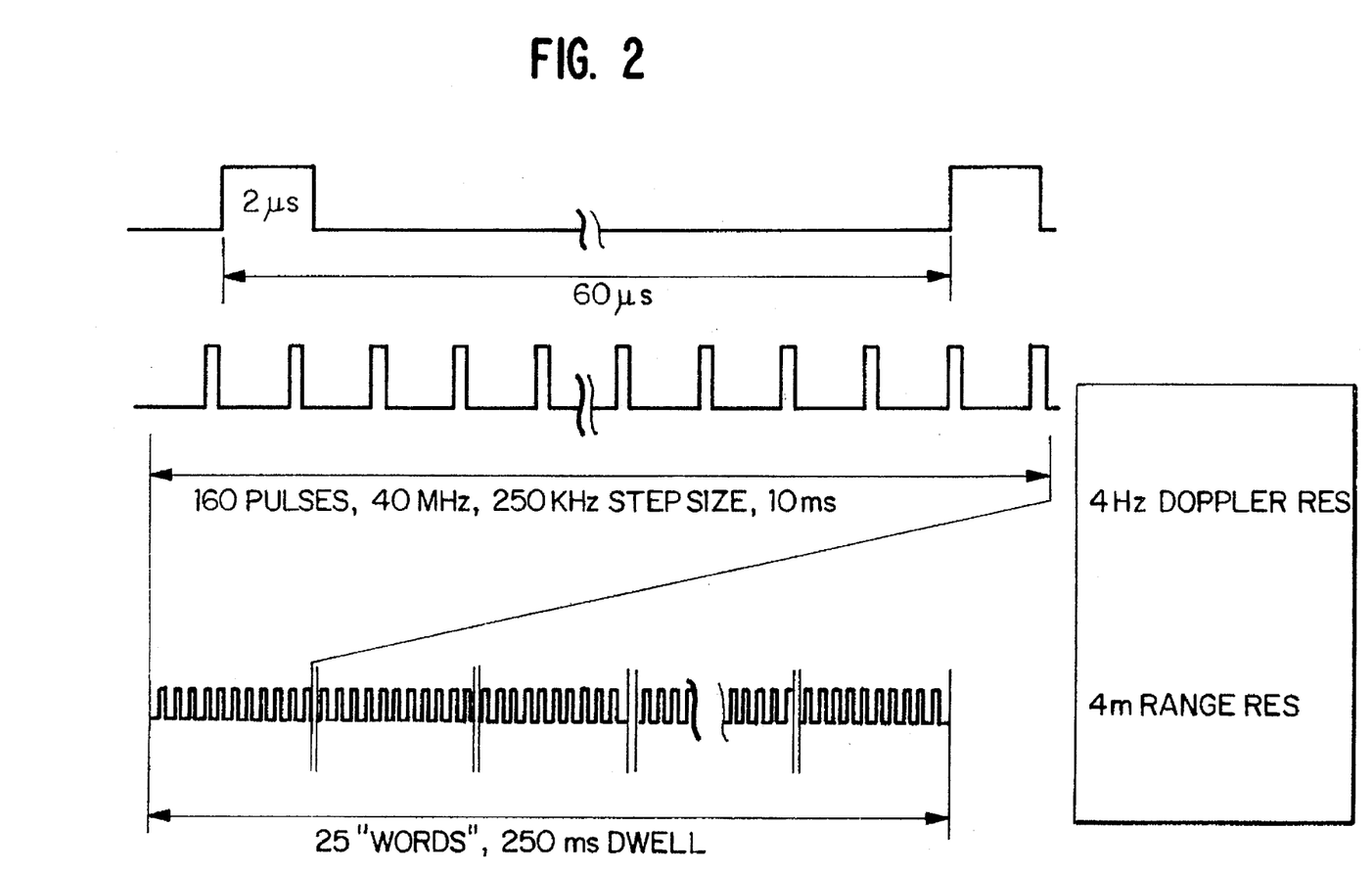
FIG. 2 is a waveform diagram according to the invention.

A. Modified Weather Radar:

The radar modification consists of applying randomized stepped frequency pulse compression to allow a range resolution of 4 meters (even though a pulse length of 2 μsec would normally limit range resolution to 300 meters). The waveform consists of a series of pulses at the normal higher Pulse Repetition Frequency (PRF) of the weather radar (~3000 Hz). The first 160 pulses are randomly stepped in frequency so that each pulse is at a different frequency. Any one pulse, however, stays at a constant frequency for its entire 2 μs duration. This is important because it allows the precision measurements to be made without modifying the bandpass characteristics of the radar receiver. The frequencies are such that there are 160 different frequencies spanning 40 Mhz in 250 Khz steps. Over the time of each set of 160 pulses, the 40 Mhz spectrum is completely filled. The order of the steps is randomized to avoid ambiguities. A diagram of the waveform is shown in FIG. 2. The step size is 250 Khz which corresponds to a 4 μs or 600 meter "coarse" range bin. This wider (than 2 μs) coarse bin was chosen to eliminate any ambiguities from adjacent pulse "spillover" energy. The waveform can be as long as necessary to integrate returns for a precise Doppler measurement.

The waveform is extended to multiples of 160 pulses because 160 is the number of pulses required to cover the 40 MHz bandwidth needed for 4 meters range resolution. In this case the integration time is limited to 0.25 seconds since, at X-band, it will yield a velocity resolution of 0.07 m/sec. which is a sufficient accuracy to update the navigation Kalman filter.

Figure 3:
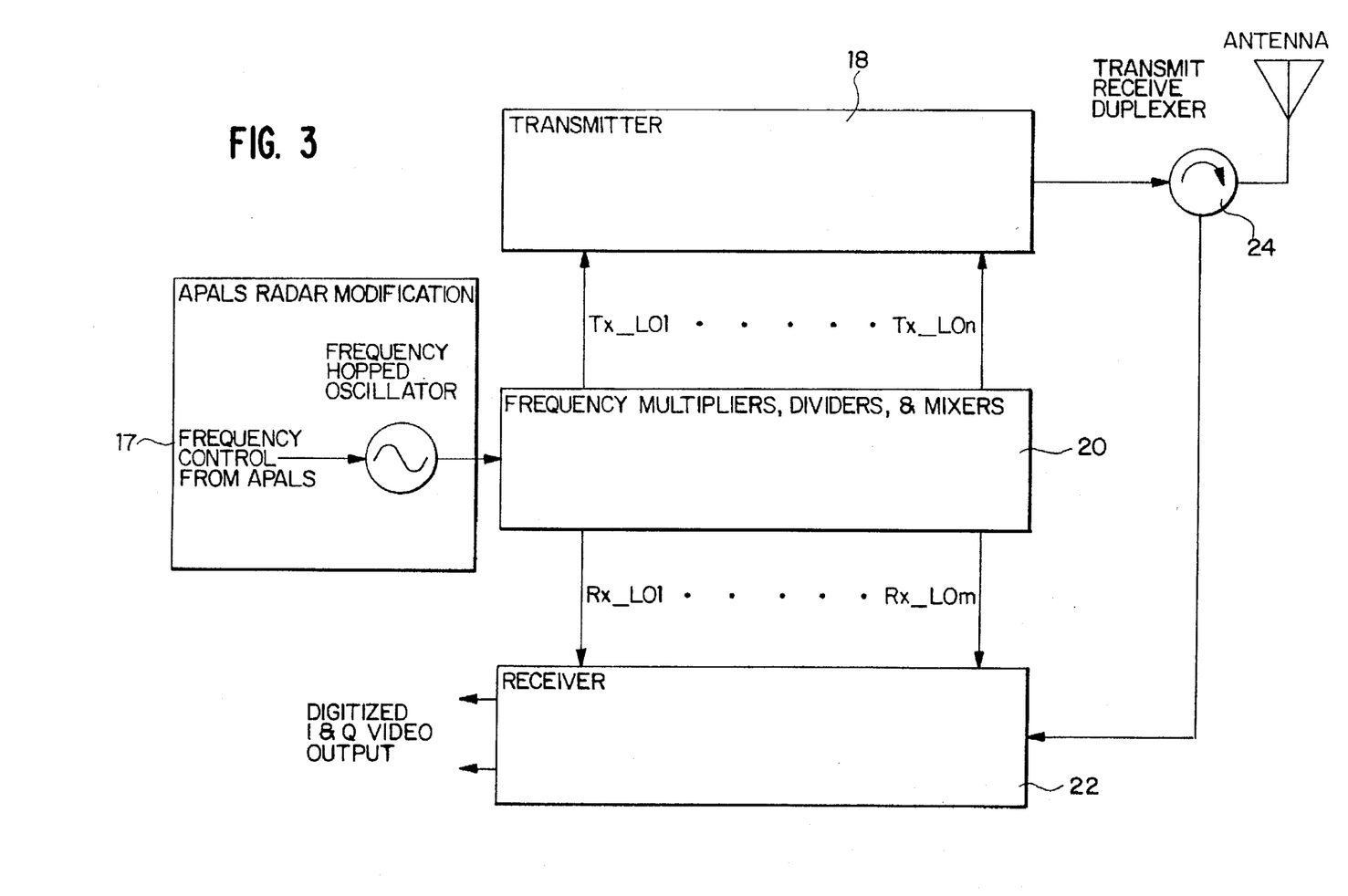
FIG. 3 is a circuit diagram of a modified weather radar device according to the invention.

FIG. 3 shows a typical implementation of generating the waveform by adding a steppable frequency oscillator 17 to the weather radar. As shown in FIG. 3, the majority of the circuits of radar (transmitter 18, frequency multipliers, dividers and mixers 20, receiver 22, duplexer 24) remain unchanged. The integration of the modified waveform into the weather radar from each of the different radar manufacturers will be unique.

Processing the waveform to achieve the desired resolution (4 m in range and 0.07 m/sec. in Doppler) is accomplished in a highly efficient manner because the image is being taken of just one short segment of range (where the beam intersects the ground). The "picture" or map will extend 160 meters or 40 pixels in range and therefore is contained in one 600 meter "coarse range". This is in effect "zoom processing" of the region which is very efficient. The application of zoom processing to this unique waveform allows very high resolution to be achieved with very minor physical modifications to a normally low resolution radar.

Motion Compensation: The Synthetic Aperture Radar (SAR) map that is required for this system to work well covers a small area and the accuracy of the vehicle motion required is within the bounds of the knowledge of the system. This is because the navigation portion of the system will have very precise knowledge of the state of the vehicle's motion relative to the earth as will be discussed below.

The following delineates the steps required for the two dimensional zoom processing of APALS.

As described in the waveform of FIG. 2, during the integration of 0.25 seconds there are 4000 pulses. This large integration time is broken down into 25 sub-intervals or "words" of 160 pulses each (FIG. 2). During each sub-interval, the full bandwidth of 40 MHz is transmitted by having each pulse at a different frequency taken, at random, from a set of 160 frequencies spaced 250 KHz apart. If the lowest frequency were 9 GHz, the sequence of frequencies would be: 9.000 GHZ, 9.00025 GHz, 9.005 GHz, 9.00075 GHz, 9001 GHz . . . 9.040 GHz. The order is scrambled randomly for reasons which will be explained below.

Figure 4A:
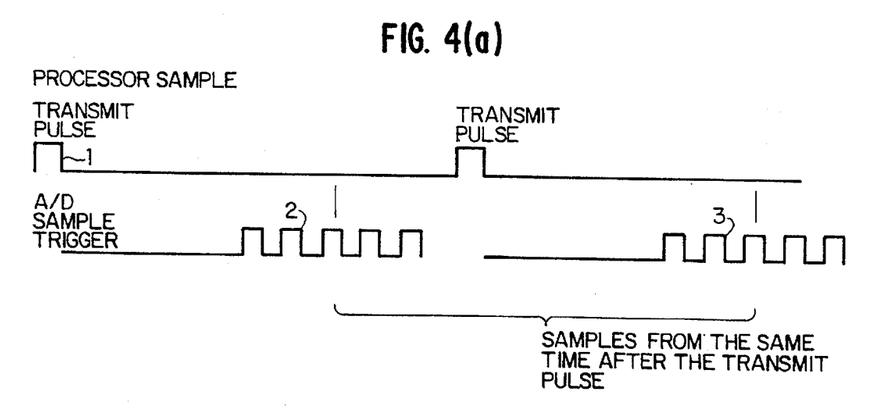
FIGS. 4(a)–4(e) illustrate steps of APALS Synthetic Aperture Radar (SAR) processing according to the invention.

FIG. 4(a) is a wave diagram for explaining a coarse range bin. With a 2 µs pulse (1), if the receive signal (2) and (3) is sampled the same time delay after the transmit pulse, those returns will all represent targets or ground clutter from the same range. Since the pulse is 2 µs wide, the energy at the time of the sample will come from 150 meters in front of to 150 meters behind the point on the ground with a time delay of the sample center. The processing chosen covers a 600 meter region centered at the time of the central return. While there should be no return in any area beyond ± 150 meters, there may be spill-over from other bright reflectors and by processing the wider coarse bin, the possibility of ambiguous foldover is eliminated.

Figure 4B:
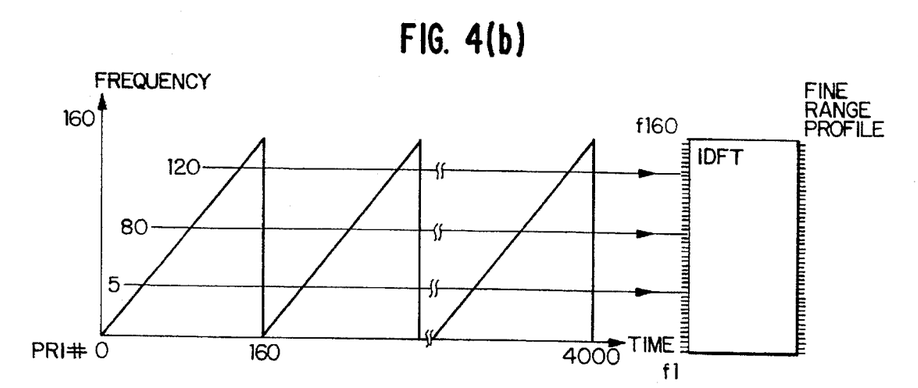

To simplify the explanation, a "linear" rather than a random frequency sequence is examined. In FIG. 4(b) it is seen that the samples, each being from a different pulse in the chain of 4000 pulses, range in frequency from $f_1$ to $f_{160}$ and then $f_1$ to $f_{160}$ is repeated for the next 160 Pulse Repetition Intervals (PRI's) and so on for 25 sub-intervals until 4000 pulses have been transmitted and 4000 receive samples have been gathered. As shown from FIG. 4(b), processing the 4000 samples into a range profile of fine 4 meter bins is nothing more than summing the sample values that come from the same frequency (there are 25 of them) and using the sum as one of the inputs to an Inverse Digital Fourier Transform (IDFT), and representing that process for all 160 frequencies. A Fourier transform is a process of taking samples in time of a waveform and determining how much energy there is at each frequency and the inverse of the process is taking samples of energy content at different frequencies and producing what the waveform looks like as a function of time (time is equivalent to range for a radar echo).

The example given above and in FIG. 4(b) is a simplification that would work well if there were no motion between the radar and ground. In order to describe what is necessary for APALS to accommodate motion, it is necessary to introduce the concepts of phase and phase compensation.

Figure 4C:
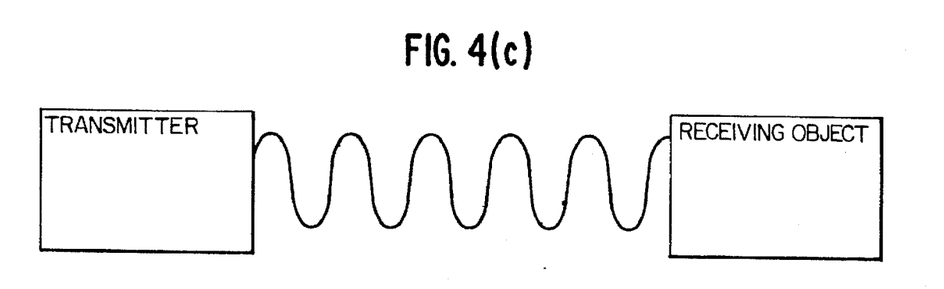

The phase of a radar signal depends on two items, the frequency or wavelength of the signal and the distance from the transmitter. This is shown in FIG. 4(c). Radar waves are variations in local electric and magnetic fields which can be represented by the sine wave shown in FIG. 4(c).

The distance from one peak to another is called the wavelength and is determined by the frequency of the transmitted signal. FIG. 4(c) shows a Receiving Object whose distance is 5-¼ wavelengths away from the Transmitter. The whole number of wavelengths is not important to phase but the remainder or fractional part is the phase difference between what is sent and what is received. In FIG. 4(c), the phase difference is ¼ of one wavelength or 90° (one wavelength is characterized by one full cycle of 360°). If the receiving object simply reflected the signal back to a Receiver co-located with the transmitter, as is the case with radar, the distance and, therefore, the phase shift is doubled to 180°.

Figure 4D:
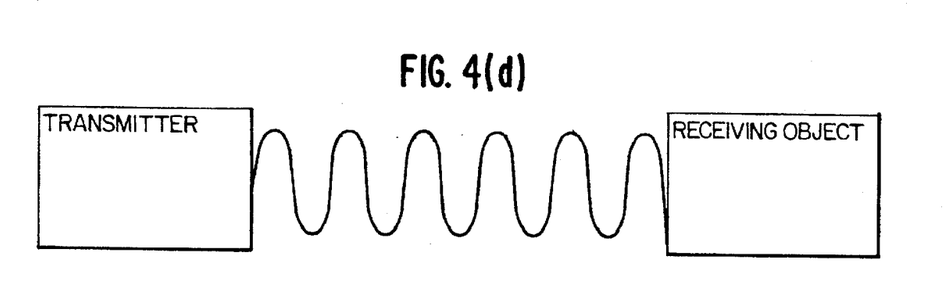

The phase of the returns from different samples but off of the same stationary object will change with a frequency hopped radar such as APALS. FIG. 4(d) shows the effect of changing wavelength on phase. In FIG. 4(d), even though the transmitter and the receiving object are the same distance apart as they are in FIG. 4(c), the phase has increased to 180°, one way. In FIG. 4(d) there are 5-½ wavelengths in the single path-length.

As the frequency of the pulses increases (FIG. 4(b)), the wavelength gets shorter and the phase difference increases. It is precisely this change in phase as a function of frequency that allows the IDFT to discern the ranges of object from the frequency content of the return samples. The samples, by their nature, contain both a measure of the energy and a measure of the phase difference of the return from a pulse of a particular frequency.

Figure 4E:
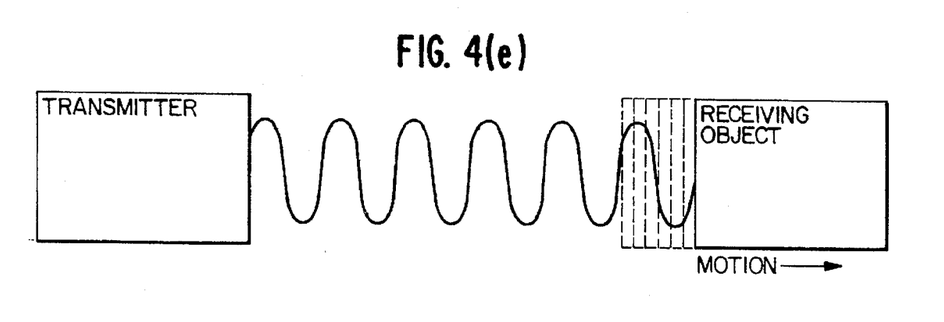

Relative motion between the Transmitter and the Reflecting Object causes a phase shift with time which causes a phase shift from pulse to pulse as shown in FIG. 4(e).

This phase shift as a function of time is known as the Doppler effect. The measurement of this rate of change of phase or Doppler is what allows APALS to update range rate as well as range for the inertial system after each map-match. It is also what creates the need for phase compensation.

It is important to note that the phase changes due to increasing frequency have the same characteristic as the phase changes due to increasing distance between the transmitter and the reflecting object. In both cases, the phase changes will increase steadily with time. This is the ambiguity that was mentioned earlier. As long as the frequencies are stepped in order from pulse to pulse, the IDFT will not be able to distinguish between distance of the Reflecting Object and the speed of the Reflecting Object. This is because the distance information is contained in the phase differences of the reflections off a single object at different transmit frequencies.

To obviate this ambiguity problem, the frequencies are not stepped in order of increasing frequency as shown in FIG. 4(b), but rather randomly. This breaks the linearity of the phase changes with time due to frequency shifting so that it can be separated from the always linear changing phase that is due to constant velocity motion. It is still necessary to present the sampled values of the return signal to the IDFT in order of increasing frequency so the order of frequencies transmitted must be kept track of. This is accomplished in APALS by using a pre-stored pseudo-random frequency order which is 4000 elements long.

Once the relationships between distance, phase, and velocity are understood in the context of the APALS waveform as described above, the phase compensation and processing for APALS can be concisely explained in the following steps:

1) The received waveform is converted to a set of digital samples which preserves both signal strength and phase difference. This process is well known in the art as in-phase and quadrature sampling or I & Q sampling. The digital samples are stored temporarily and tagged both with their order in time of reception and with their frequency order.

2) The coarse range of interest is identified by the system based on the desired map area, and the samples which come from the corresponding delay are singled out for processing.

3) The Doppler frequencies are determined for the desired map area, and the center frequencies for the Doppler bins to be processed are determined.

4) For each Doppler bin, the set of samples is arranged in order of the transmit frequency which generated it, and presented for phase compensation prior to being sent to the IDFT.

5) For each Doppler bin the phase rotation for each transmit frequency and each receive time is calculated and that phase is subtracted from each sample according to its time order and adjusted for its wavelength based on its transmitted frequency. The net effect is that motion is taken out of the samples that are moving at the precise velocity that is the designated center of the Doppler bin or filter. Objects that are moving faster or slower will not "add up" because the phases of their samples will not be recognized by the IDFT.

In order to prevent smearing, due to accelerations which change the velocity during the 0.25 second dwell, the compensating phase rotations must be calculated based, not on a constant velocity, but on a velocity modified by the aircraft's accelerations. These acceleration values are readily available in the APALS system because they are part of the accurate state vector which is calculated by the navigation filter.

B. Area Correlation

The APALS system uses the Scene Data Base 10 for pre-stored scenes as references with which to compare the radar maps that are produced through the weather radar. The radar maps can be thought of as comprising resolution "cells" whose dimensions are range resolution in the down range direction and range rate resolution in the cross range dimension. Down range direction is simply the radial distance from the aircraft. In a radar system the normal way of mapping with a radar is to cut the return up into pieces that are returns coming from different ranges. This is because the radar is capable of measuring range by the time delay of the return. The down range dimension is always the distance radially away from the radar. The present system is typically looking at 45° right or left and so the down range dimension is a line going 45° off the nose of the aircraft. The cross range dimension is the dimension that is directly orthogonal or at 90° to the down range dimension. It is not always exactly 90°, in the present system it is measured by changes in the doppler frequency of the return. The frequency of the return is dependent on the relative velocity in the direction of that return. The contextual information in the radar map is compared to that of the reference. When a match is found for each point of ground represented by a cell in the reference, the range and range rate of the sensed scene are known with respect to the aircraft. Since the location of at least one point in the scene is known precisely with respect to the desired touch down point, by simple vector subtraction, the range rate to the touch down point is calculated. There are two aspects to generating this important information:

1) Generating a reference which will allow a locally unique match to the radar map.

2) Using a correlation algorithm that efficiently "fine-tunes" the match point to a 1-cell accuracy and provides a "measure of goodness" or confidence in the match.

The references for APALS are generated from aerial photographs that have been digitized or scanned into a computer and from SAR maps. The SAR maps are taken in two swaths, one on either side of the final approach trajectory, that are centered 1 mile offset of the aircraft's trajectory (ground projection). Software is used to match points in the aerial photo with coordinates of a pre-stored navigation grid so that the location of any point in the photo is known relative to the runway touch down point (no matter how far the scene is away from the runway). The key features of these references are that they are simple and that they rely on prominent cultural and natural features which produce consistent radar returns that are distinguishable as lines with a unique shape. The two types of features to have these characteristics consistently are the corners made by a building face and the ground, and roads.

Figure 5:
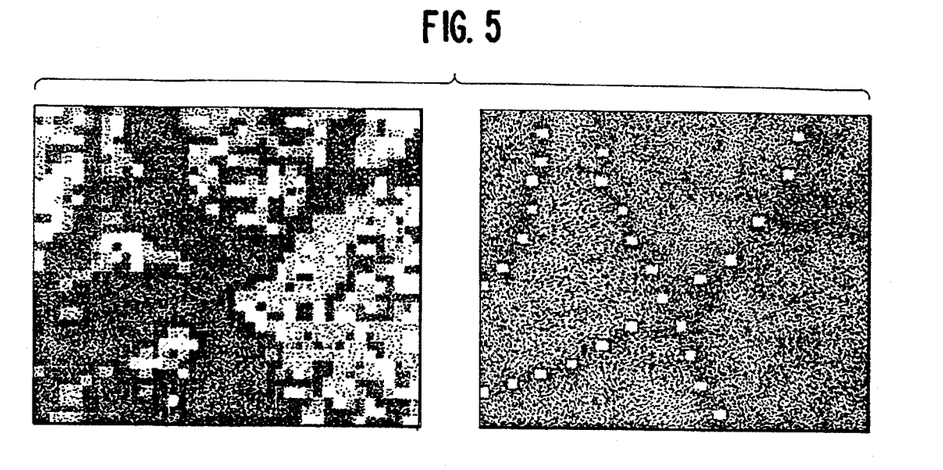
FIG. 5 shows a reference scene and a corresponding Radar Map according to the present invention.

FIG. 5 shows a typical reference and the corresponding radar map. In this case the dots represents a specific pattern of a highway crossing. Such simple references are found to work well when used with the map matching algorithm well known in the art as the "generalized Hough transform" which is described below.

The correlation algorithm used for map matching in the APALS system is the well known generalized Hough transform. The Hough transform is incorporated in several image processing techniques in use today, especially in military applications. In general, the Hough transform is a computer method typically used to find a line or other simple shapes/patterns in a complex picture. This scene matching algorithm is advantageous in that:

a) It requires very few points to be compared, (i.e., much less than the total in the scene).

b) It requires the computer to perform only the mathematical operation of adding and avoids the other more time consuming mathematical operations.

Figures 6A, 6B:
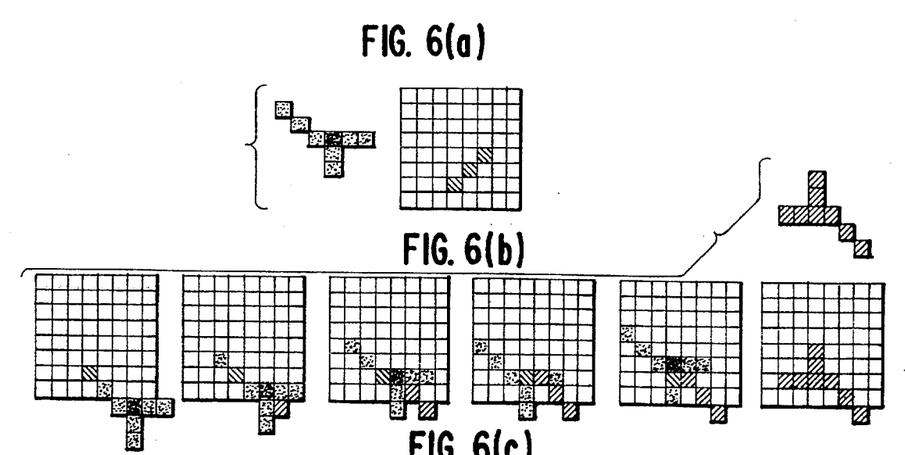
FIG. 6 illustrates a Generalized Hough Transform Map-Match Algorithm employed in the present invention.

In FIG. 6(A) a simple reference is shown to the left and a very sparse sensed scene (just two points) is shown to the right. The algorithm works such that every point in the sensed scene is operated on in the following manner:

1) Each point in the reference is tried as the particular sensed point.

2) As each point in the reference is tried, the position that the "nominated point" (black point in the reference) occupies in the sensed scene is recorded. This is shown in the sequence of scenes in FIG. 6b. After all the points in the reference are used, the set of recorded "nominated" points in the sensed scene is an "upside-down and backwards" replica of the reference scene, rotated about the "nominated point". This reversed image is shown above the last block of FIG. 6b.

Figure 6C:
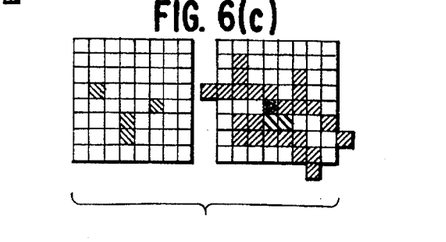

3) As all the points in the reference are operated on, the point in the scene with the most accumulated nominations is designated as the match point. This is illustrated in FIG. 6c.

C. Range/Range Measurements Integrated Into Kalman Filter

Figure 7:
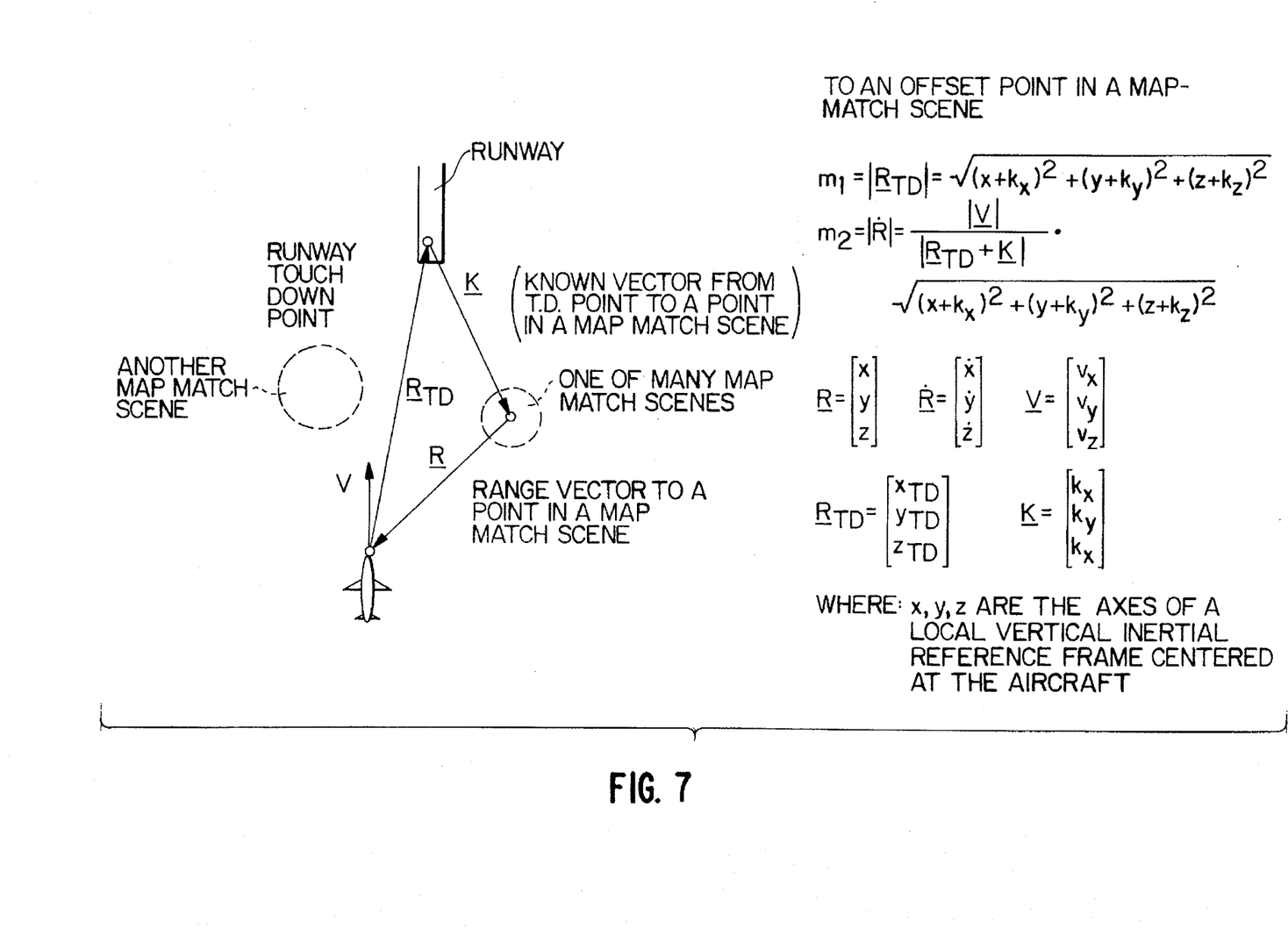
FIG. 7 illustrates a Navigation Solution according to an example of the invention.

The measurements being made by the radar are the magnitude of the range vector and the magnitude of the range-rate vector from the aircraft to a specific point in the map match scene. If at least three of these measurements were being made simultaneously, one could solve for the three elements of aircraft velocity explicitly. This solution is shown in FIG. 7. The sequence of measurements being made in FIG. 7 are the range and range-rate to known points on the ground. The way in which these are used is exactly analogous to the way the global positioning system works with satellite measurements. For example, consider three satellites that are displaced in the sky angularly. If the range and the range rate to those satellites are known, then the components of both the position vector and the velocity vector of the position relative to those three satellites can be solved. Beyond that, it is necessary to depend on information stored on the satellites and transmitted down so that it can be determined where they are. Then the position can be deduced. The difference in APALS is that the APALS system takes pictures of the actual ground and compare the taken pictures to stored maps. Once it compares them to stored maps and finds the match point, the match point is immediately known in terms of its range and range rate at that point of time. As APALS progresses it measures its range and range rate relative to known points on the ground. Once it measures three different points, it can form a deterministic solution of where it is, in what direction it is heading and how fast it is going. The sequence in APALS is a little different in that it does not obtain a good geometric case in close time proximity. Rather, it flies along mapping from side to side but not getting that third one. It repetitively gets the range and range rates on each side, and over time forms a very accurate solution iteratively to the equation that allows it to know its position vector and velocity vector.

Since, however, the measurements being made by radar are separated in time by as much as 4 seconds, it is necessary to solve for the components of the vectors recursively, over time, through the use of a Kalman statistical filter. The Kalman filter uses data from an inertial navigation system INS, or an inertial measurement unit (IMU) 4 (FIG. 1) to determine the motion of the aircraft between measurement times. The INS or IMU 4 is more than just the inertial instruments, but the complete collection of inertial instruments and computer that result in a navigation solution including position and velocity. An INS is typically only used on commercial aircraft today that traverse the ocean.

D. Situational Awareness Display Format

The raw output of the APALS system is a very accurate estimate of the "state vector" of the aircraft in a coordinate system that has its origin at the desired touch down point on the particular runway that is targeted. This knowledge of position, velocity and attitude are provided as a "situational awareness" display which the pilot can effectively use to safely land the aircraft. This is accomplished primarily by displaying a conformal, properly positioned runway outline in proper perspective to the pilot on a Head-up Display (HUD). In clear weather the image will overlay that of the actual runway edges as the pilot views the runway through the wind screen. The appropriate touch-down zone will also be displayed (conformably), thereby providing the pilot situational awareness such that (s)he may land his/her aircraft in the same manner as (s)he would in visual meteorological conditions (VMC). The use of the HUD allows the pilot the earliest possible view of the actual visual scene on the way to touchdown. The precise navigational knowledge of the APALS system together with the radar altimeter allows for the generation of a "flare cue" to tell the pilot when and how to flare for a precise, slow descent-rate touchdown.

Figure 8:
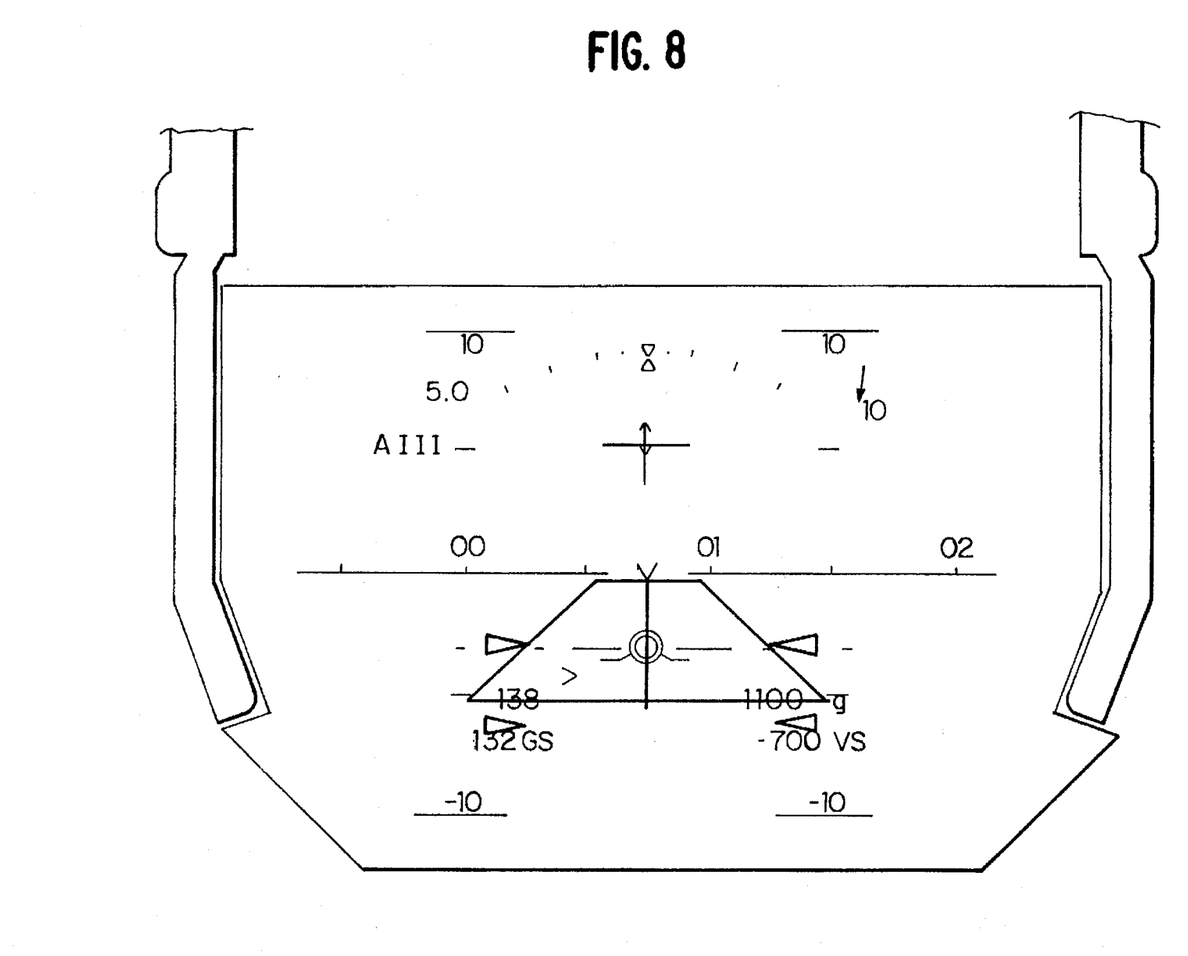
FIG. 8 illustrates a Head-up Display (HUD) according to the present invention.

The key aspect in being able to land using situational awareness is the display of the conformal runway symbol and extended center-line in a context which also includes conformal symbols of the horizon line, flight path vector, and 3° glide slope indicator. The display of these symbols can be derived from APALS navigation knowledge or from other aircraft instruments. FIG. 8 shows a particular symbol set with the addition of the synthetic runway image.

True ground speed information in the APALS system is sufficient to generate moving segments in the extended center-line to create a sensation of "speed" for the pilot.

A secondary aspect of APALS is that the X-band radar together with APALS enhanced resolution can detect runway incursions prior to landing in low visibility conditions. This is accomplished with a broad sweeping ground map just prior to landing which is similar to the "ground map mode" of a conventional weather radar. The notable exception is that the range resolution is two orders magnitude sharper than that of the conventional weather radar. This allows large objects, such as a taxiing aircraft to be resolved into more than one pixel. As a result, the APALS is able to correctly distinguish and separate larger and smaller objects from each other. When this is coupled with the precise navigational knowledge of APALS, any radar returns can be related to their precise location in the airport scene to determine if they are a hazard.

As set forth above, the APALS system does not depend on ground equipment installed at a particular airport. It therefore offers the potential of low-visibility landings at many airports than are currently unavailable for such landings because they do not have the ground equipment of sufficient reliability to support the automatic landing systems.

Further, APALS does not require the addition of any new vision sensors on the aircraft or installations on the ground and therefore installation costs are minimum. The accuracy and reliability of the display can be checked and verified during normal visual operations. It can also be routinely used for training at any airport during normal visual operations. In addition, it can detect runway obstacles prior to landing without adding any sensors.

The display for APALS can be either head-up or head-down.

The waveform can be varied in PRF (Pulse Repetition Frequency), pulse width, bandwidth, and integration time to affect changes in resolution and processing dynamic range. The Pulse Repetition Frequency is the number of pulses per second that the radar transmits. This is important because the PRF determines the amount of average power that the radar receives. It also determines what kind of ambiguities there are in range.

Those skilled in the art will understand that variations and modifications can be made to the system described above, and that such variations and modifications are within the scope of the invention. For example, different scene match correlation algorithms and different navigation filters (other than Kalman) such as neural net "intelligent" estimators can be used without changing the nature or concept of the present invention.

What is claimed is:

1. An approach and landing system for an aircraft, said system comprising:

at least one navigation unit for providing navigation information;

a low-bandwidth radar unit for providing radar information;

a processor unit coupled to receive navigation information from said at least one navigation unit, and to receive radar information from said radar unit, said processor unit providing an output based on the provided navigation information and radar information;

a memory, coupled to said processor unit, for storing information representing a scene, said processor unit correlating the stored scene information with the output of said processor unit to provide a mapped scene, said mapped scene comprising a real-time virtual view from said aircraft;

a display unit, coupled to receive the output of said processor and coupled to said memory, for displaying said mapped scene for use in navigating said aircraft;

and a steppable frequency oscillator for providing a signal which is stepped in frequency to said radar unit, thereby providing an increased range resolution.

2. The approach and landing system as defined in claim 1, wherein said processor unit operates according to a Generalized Hough Transform map-match routine to provide the mapped scene.

3. The approach and landing system as defined in claim 1, wherein said signal provided by said oscillator to said radar unit is randomly stepped in frequency.

4. The approach and landing system as defined in claim 3, where said signal provided by said oscillator to said radar unit comprises a series of pulses.

5. The approach and landing system as defined in claim 4, wherein a first predetermined number of said pulses are randomly stepped in frequency so that each of said predetermined number of pulses is at a different frequency.

6. The approach and landing system as defined in claim 5, wherein the predetermined number of pulses is 160.

7. The approach and landing system as defined in claim 1, wherein a frequency step size of said oscillator is 250 KHz.

8. The approach and landing system as defined in claim 1, wherein said at least one navigation unit includes an Inertial Navigation System (INS).

9. The approach and landing system as defined in claim 1, wherein said at least one navigation unit includes a Global Positioning System (GPS).

10. The approach landing system as defined in claim 1, wherein said real-time virtual view is of sufficient accuracy to allow a pilot to fly said aircraft without an actual view from said aircraft.

11. The approach landing system as defined in claim 1, wherein said real-time virtual view is of sufficient accuracy to allow a pilot to land said aircraft without an actual view from said aircraft.

12. A method of improving a range resolution of an aircraft approach and landing system including a low-bandwidth radar unit, the method comprising the steps of:

generating a waveform which is stepped in frequency;

applying the generated waveform to the radar unit in said approach and landing system to improve the range resolution of said radar unit; and using said radar unit to determine a resolution-improved range of said aircraft, said resolution improved range being of sufficient accuracy so that said approach and landing system is operable for at least one of automatically landing an aircraft without pilot intervention based on said resolution improved range and displaying a real-time virtual view from said aircraft of sufficient resolution range based on said resolution improved range to allow a pilot to safely land said aircraft without an actual view from said aircraft.

13. The method as defined in claim 12, wherein said generating step includes the step of randomizing the frequency steps so that the waveform applied to the radar unit is randomly stepped in frequency.

14. The method as defined in claim 13, wherein said generating step includes generating a series of pulses as the waveform.

15. The method as defined in claim 14, wherein a predetermined number of said pulses is randomly stepped in frequency so that each pulse is at a different frequency.

16. The method of improving a range resolution according to claim 12, further comprising the steps of:

storing said generated wave form, receiving a signal into said radar unit, and using said generated wave form to decode said signal received by said radar unit.

17. The method of improving a range resolution of an aircraft according to claim 12, further comprising the step of using said determined range of said aircraft to automatically control the flight of said aircraft.

18. The method of improving a range resolution according to claim 17, wherein said step of automatically controlling includes automatically landing said aircraft.

19. A method of improving a range resolution of an aircraft approach and landing system including a radar unit, the method comprising the steps of:

generating a waveform which is stepped in frequency;

applying the generated waveform to the radar unit in said approach and landing system to improve the range resolution of said radar unit;

using said radar unit to determine a resolution-improved range of said aircraft; and displaying a virtual image representing a view from said aircraft, based at least in part on said resolution-improved range.

20. An aircraft navigation system comprising:

a plurality of control mechanisms for controlling the flight of an aircraft;

a radar unit for providing radar information;

means for providing a signal which is stepped in frequency to said radar unit to increase the range resolution of said radar unit so that said radar unit is operable for providing accurate representations of the earth-surface below said aircraft;

a memory, coupled to said processor unit, for storing predetermined earth-surface information;

a processor unit coupled to receive actual earth-surface information from said radar unit and said predetermined earth-surface information from said memory, said processor unit providing an output to at least one of said control mechanisms for automatically controlling the flight of said aircraft, said output based on the correlation between said stored predetermined earth-surface information and said actual earth-surface information, wherein said aircraft navigation system is operable for automatically flying said aircraft safely in near-land altitudes based on said output.

21. The aircraft navigation system according to claim 20, further comprising a display unit, coupled to receive the output of said processor and coupled to said memory, for displaying an image based on the output of said processor and an image representing said earth-surface information.

22. The approach and landing system as defined in claim 20, wherein said signal is applied to said radar unit for both transmitting and receiving.

23. The aircraft navigation system according to claim 20, wherein said output is used to automatically control said aircraft.

24. The aircraft navigation system according to claim 23, wherein said output is used to automatically land said aircraft.

25. The aircraft navigation system as defined in claim 20, wherein said radar unit is a weather radar unit.

26. The aircraft navigation system as defined in claim 20, wherein said earth-surface information represents a specific location.

* * * * *